United States Patent [19]

Sireix

[11] 4,163,429

[45] Aug. 7, 1979

[54] DEVICE FOR APPLYING ADHESIVE TO A PLURALITY OF STRIPS

[76] Inventor: Georges Sireix, 9, rue Saint-Marc, 68400 Riedisheim (Haut-Rhin), France

[21] Appl. No.: 822,330

[22] Filed: Aug. 5, 1977

[30] Foreign Application Priority Data

Nov. 10, 1976 [FR] France ................................ 76 34816

[51] Int. Cl.[2] ......................... B32B 31/08; B32B 31/12

[52] U.S. Cl. .................................... 118/117; 118/122; 118/DIG. 24; 156/431; 156/549; 156/578

[58] Field of Search ............... 156/390, 547, 549, 551, 156/578, 425, 430, 431, 446; 118/117, 122, 419, 423, 424, 428, 56, DIG. 24

[56] References Cited

U.S. PATENT DOCUMENTS

| | | | |
|---|---|---|---|
| 1,944,886 | 1/1934 | Goessmann | 156/446 X |
| 2,046,293 | 6/1936 | German | 118/117 |
| 2,050,519 | 8/1936 | Bleibler | 118/419 |
| 2,433,965 | 1/1948 | Upson | 118/117 |
| 2,528,152 | 10/1950 | Landgraf | 156/551 |
| 3,430,543 | 3/1969 | Cunningham | 156/195 |

*Primary Examiner*—Michael G. Wityshyn
*Attorney, Agent, or Firm*—Robert E. Burns; Emmanuel J. Lobato; Bruce L. Adams

[57] ABSTRACT

In apparatus for applying fluid adhesive to strips to be wound helically to form a tube, the strips are led over a tank in step-wise configuration with successive strips laterally and vertically offset relative to one another but overlapping so that an upper strip partially overlaps the next lower strip. Liquid adhesive pumped from the tank is delivered onto the uppermost strip which then passes through scrapers which scrape surplus adhesive off the strips so that at least part of the surplus flows off a lateral edge of the uppermost strip onto the next lower strip. If there are more than two strips, the process is repeated so that surplus adhesive is flowed at least in part from each strip to the next lower strip. Any surplus not retained by the strips flows back to the tank.

10 Claims, 5 Drawing Figures

DEVICE FOR APPLYING ADHESIVE TO A PLURALITY OF STRIPS

FIELD OF INVENTION

The invention relates to a device for applying fluid adhesive to fibrous, cellulose, metallic, plastic and other materials in the form of strips used for forming tubular wrappings.

BACKGROUND OF THE INVENTION

In order to form tubular wrappings, several strips of paper, aluminium and others are helically rolled, the number of these strips depending on the thickness of the wall of said wrapping. However it is necessary to cover said strips with adhesive. According to the nature of the material forming the strip and/or the thickness thereof it is necessary to modify the thickness of the film of adhesive. Frequently, it is necessary to modify this thickness during the operation of the machine forming tubular wrappings and, for this reason, this change must be able to be effected simply and rapidly.

SUMMARY OF THE INVENTION

The present invention has as its aim the provision of an adhesive applying device for resolving this problem.

To this end, the invention concerns a device for applying adhesive to fibrous, cellulose, metallic, plastic and other materials in the form of strips intended for the formation of tubular wrappings, characterised in that it comprises removable scrapers disposed horizontally according to a given longitudinal progression on a support sloping in relation to the vertical so as to modify the thickness of the film of adhesive and to ensure an application of adhesive to the strips by said adhesive flowing from one strip to another.

BRIEF DESCRIPTION OF DRAWINGS

The invention will be well understood by referring to the following description given as a non limiting example and to the accompanying drawings in which.

DESCRIPTION OF PREFERRED EMBODIMENT

Figures 1, 2, 3, 4, 5:
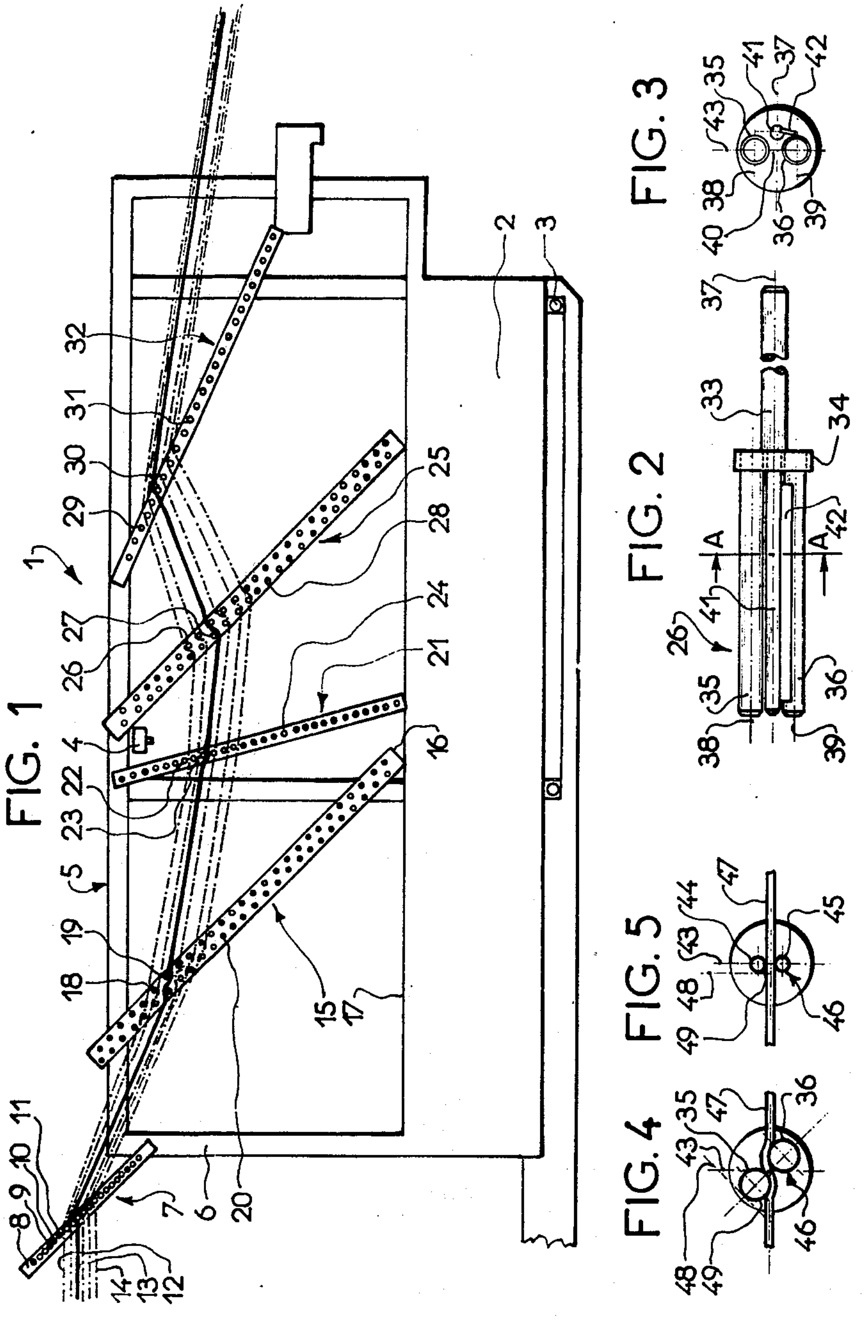
FIG. 1 is a schematical view in elevation of an adhesive applying device in accordance with the invention.
FIG. 2 is a view in elevation of a scraper for spreading the adhesive on the strips.
FIG. 3 is a view from the left of FIG. 2.
FIGS. 4 and 5 are sectional views along lines A—A of FIG. 2, only the diameter of the rollers being different.

Reference is made to FIG. 1.

The adhesive applying device 1 comprises a tank 2 containing liquid adhesive, this latter being heated or not by a hot-water bath. With the help of a means such as pump 3, liquid adhesive is drawn from tank 2 and directed towards at least one flow element 4 situated in the upper part 5 of said device.

Tank 2 is provided with a metal framework 6 serving as the frame for different elements ensuring, on the one hand, the transport of the strips of paper, aluminium and other similar materials in the form of strips and, on the other hand, the application of adhesive thereto. At inlet 7 of device 1 there is provided a support 8 sloping in relation to the vertical. On this support 8 are fixed horizontal rollers 9, 10 and 11 of small diameter and slightly spaced from one another. The number of these rollers 9, 10 and 11 is immaterial. However, the front ends of these horizontal rollers 9, 10 and 11 are more and more spaced apart from the front face of support 8 the further one goes down said support 8. For this reason, the different strips 12, 13, 14 coming from a supply roller, not shown, are not superposed but are offset laterally and vertically in relation to each other. However this offset is such that there is an overlapping in relation to the vertical plane of the front end of the upper strip and of the rear end of the lower strip. The strips are thus arranged transversely of the tank in a stair step or terraced configuration.

Adjacent this support 8 is placed a second support 15 whose lower end 16 is integral with the upper flange 17 of tank 2. On this support 15 there is spread out a number, equal to the horizontal rollers 9, 10, 11, of braking rollers 18, 19, 20. The distance between the axes of these braking rollers 18, 19 20 being greater than the distance between the axes of horizontal rollers 9, 10, 11, the strips are given a certain downward slope. The role of these braking rollers 18, 19, 20 is to give to the strips a certain tension between said braking rollers 18, 19, 20 and the machine for forming the tubular elements placed downstream of the adhesive applying device 1. As in the case of horizontal rollers 9, 10, 11, the front ends of these braking rollers 18, 19, 20 are spaced further and further from the front face of support 15 so as to maintain the particular position of strips 12, 13, 14.

Downstream of second support 15 the adhesive supplying device 1 has a third sloping support 21 provided with a given number of guide rollers 22, 23, 24. After this support 21, there is provided a fourth sloping support 25 provided with a plurality of scrapers 26, 27, 28. These scrapers 26, 27, 28 serve, on the one hand, to spread out the film of adhesive on said strips 12, 13, 14 and, on the other hand, to scrape the surplus adhesive from these strips 12, 13, 14 while letting pass a certain thickness of adhesive.

After passing through scrapers 26, 27, 28 strips 12, 13, 14 are partially rolled around a second guide roller 29, 30, 31 maintained by a sloping support 32.

The path of the strips 12, 13, 14 coming from the supply roller is the following: they pass over horizontal rollers 9, 10, 11; then through braking rollers 18, 19, 20; then under the first guide rollers 22, 23, 24; then through scrapers 26, 27, 28 and finally over the second guide rollers 29, 30, 31 to be directed towards the machine for forming tubular wrappings.

Reference is made to FIGS. 2 and 3 showing one of the scrapers 26, 27, 28. These scrapers 26, 27, 28 comprise a shaft 33 which is engaged in a housing formed in sloping support 25. The depth of penetration is limited by a flange 34 on the shaft 33. These scrapers 26, 27, 28 are easily interchangeable since it is sufficient to withdraw shafts 33 from their respective housings. Flange 34 serves as support for two rollers 35, 36 disposed in parallel and whose length, identical for the pair of rollers 35, 36, is modified according to a given longitudinal progression depending on the position of the scraper in relation to the assembly of scrapers. These rollers 35, 36 are diametrically opposed in relation to the axis of symmetry 37 and the distance between axes 38, 39 is such that a certain space 40 is obtained for the passage of the strip. On this axis of symmetry 37 is disposed a shaft 41 provided with a scraper blade 42 adapted to be applied at an acute angle on lower roller 36. The strip passes between roller 36 and the scraper blade 42. The cooperation between said scraper blade 42 and lower roller 36 holds the end of strips 12, 13, 14 in case of breakage so as to avoid a surge of adhesive harmful to the proper operation of the wrapping machine to which the strips are fed.

This scraper blade 42 can be used not only in apparatus for applying adhesive to one face but also in apparatus for applying adhesive to both faces of strips 12, 13, 14.

The adhesive, coming from flow element 4 located between the column of the first guide rollers 22, 23, 24 and the column of scrapers 26, 27, 28 forms upstream of these scrapers 26, 27, 28 a certain bead 49 which is spread by the scrapers. Surplus adhesive flows from the upper strip on to the next lower strip to finally flows into tank 2 where it will be taken up again by pump 3 for a new flow.

The thickness of the film of adhesive can be modified in two ways:

the first is to move the scraper angularly, i.e. the two rollers 35, 36 are no longer one above the other but form a certain angle in relation to the vertical axis 43.

the second consists in replacing both rollers 35, 36 by rollers 44, 45 having a different diameter (see FIGS. 4 and 5). In fact, the greater the diameter, the greater the bead of adhesive disposed between the outer diameter 46 of the roller, the top 47 of the strip and the vertical tangent 48 and, consequently, the thickness of the film of adhesive covering the top 47 of said strip.

What is claimed is:

1. Apparatus for applying fluid adhesive to a plurality of strips to be wound helically to form tubular wrappings, said apparatus comprising a tank containing fluid adhesive, means for guiding said strips longitudinally over said tank wholly above said adhesive with said strips arranged in stair step fashion transversely of said tank with successive strips laterally and vertically offset from one another but partially overlapping so that an edge of an upper strip is disposed over the next lower strip, means for delivering fluid adhesive from said tank onto the uppermost of said strips, and a horizontal scraper extending transversely of each strip downstream of said fluid delivering means in position to spread said adhesive laterally of each strip and to cause surplus adhesive to flow off side edges of said strip, whereby surplus adhesive from an upper strip flows onto the next lower strip and any remaining surplus adhesive flows back to said tank.

2. Apparatus according to claim 1, in which said guiding means comprises a horizontal guiding roller for each strip upstream of said adhesive delivering means, and means for supporting said guiding rollers, said supporting means comprising a support that slopes downwardly in the direction of travel of said strips, whereby lower guiding rollers are progressively downstream of upper guide rollers.

3. Apparatus according to claim 21, further comprising a braking roller for each strip upstream of said adhesive delivering means, and means supporting said braking rollers, said braking roller supporting means comprising a support that slopes downwardly in the direction of travel of said strips, whereby lower braking rollers are progressively downstream of upper braking rollers.

4. Apparatus according to claim 1, further comprising a second horizontal guide roller for each strip downstream of said scrapers and means supporting said second guide rollers, with lower second guide rollers arranged progressively downstream of upper second guide rollers.

5. Apparatus according to claim 1, in which each of said scrapers comprises a horizontal shaft, means for supporting said shaft and a pair of horizontal rollers supported by and extending longitudinally beyond said shaft, said rollers being eccentric of said shaft and at opposite sides of an extension of the longitudinal axis of said shaft.

6. Apparatus according to claim 5, in which said means for supporting said shaft comprises a support that slopes downwardly in the direction of travel of said strips, whereby said scrapers for lower strips are progressively downstream of scrapers for upper strips.

7. Apparatus according to claim 5, in which one roller of said pair is located generally above the other roller of said pair, said scraper further comprising a horizontal blade bearing at an acute angle against the lower roller to grip an end portion of a strip between said blade and the lower of said rollers in the event of rupture of a strip.

8. Apparatus according to claim 5, in which said shaft is adjustably rotatable about its longitudinal axis to vary the angle between the respective strip and a plane defined by the axes of the two rollers of a said pair and thereby vary the thickness of adhesive left on the respective strip by the scraper.

9. Apparatus according to claim 5, in which said shafts are readily removable from said supporting means for interchange of scrapers having rollers of different diameters.

10. Apparatus according to claim 5, in which a flange on said shaft supports said pair of rollers.

* * * * *